Feb. 9, 1937.　　　M. SUZUKI　　　2,069,862

CARBONACEOUS ELECTRODE

Original Filed June 4, 1935

Masutaro Suzuki
Inventor

By

His Attorney

Patented Feb. 9, 1937

2,069,862

UNITED STATES PATENT OFFICE 2,069,862

CARBONACEOUS ELECTRODE

Masutaro Suzuki, Itabashi-ku, Tokyo, Japan, assignor to Asahi Denka Kogyo Kabushiki Kaisha, Tokyo, Japan, a corporation of Japan Original application June 4, 1935, Serial No. 24,851. Divided and this application July 9, 1936, Serial No. 89,810. In Japan April 11, 1935

5 Claims. (Cl. 204—4)

This invention relates to improvements in carbonaceous electrodes for use in electrolytic cells of such a nature that chlorine is liberated at the anodes during operation.

This is a divisional application of my co-pending application, Serial No. 24,851 filed June 4, 1935.

It is well recognized that chlorine is liberated at the anode when aqueous solution of chlorine compound, NaCl, KCl, HCl, etc., is electrolyzed, and that when graphite or other carbonaceous substance is used for such anodes, the electrolyte penetrates or enters into the pores of the anodes and is electrolyzed to liberate chlorine within the pores, and such chlorine facilitates collapse or crumbling of the electrodes. Nascent oxygen is also liberated within the pores and further facilitates the deterioration of graphite electrodes.

It is also well known that a chlorinated oil is used for impregnation with it of carbonaceous electrodes in order to prevent the electrolyte from penetrating or entering into the pores of the electrodes. I have found, however, that, even when the materials, i. e., oils, fats or fatty acids, have been chlorinated before the impregnation as far as possible, say to nearly zero iodine value, the chlorinated material filling the pores of the carbonaceous electrode are further chlorinated under the action of nascent chlorine liberated during the electrolytic operation at a high temperature, say above 70° C., and this super-chlorination takes place at such a high rate that the electrode collapses or crumbles and becomes of no use within several days.

It is believed that the above-mentioned super-chlorination is not effected by polymerization because the materials are almost saturated with chlorine, but are effected by replacement of hydrogen atoms in the material with the nascent chlorine, since there is evolved a remarkable quantity of HCl gas out of the electrode. Moreover, the rapid formation of HCl generates heat at a high rate to raise the temperature of the chlorinated material so that the latter is disintegrated.

An object of this invention is to prevent such super-chlorination from occurring at such a high rate that the electrode collapses or crumbles, but to cause the super-chlorination to take place at a very low rate whereby the filling materials are further hardened by this super-chlorination.

Another object of this invention is to provide carbonaceous electrodes having a long useful life even when used in electrolytic baths operated at a high temperature, say above 70° C.

A further object of this invention is to provide carbonaceous electrodes having no such coverings of material, such as oil, fat, fatty acid or chlorinated material, which is electrically non-conductive.

There are other objects and particularities of this invention, which together with the nature thereof, will be made clear by the following descriptions, with reference to the accompanying drawing, wherein:—

Figure 1:
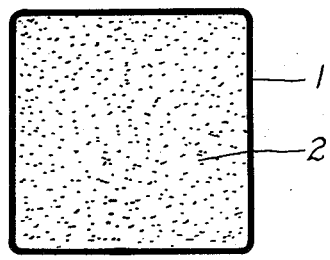
Fig. 1 shows a cross-section of a graphite electrode embodying this invention.
Figure 2:
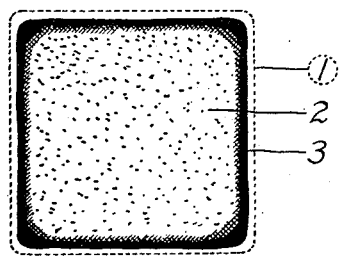
Fig. 2 shows a cross-section of a graphite electrode with super-chlorinated material formed to a certain depth after having been used for several months.

According to this invention, as shown in Fig. 1, a protective layer 1 of a substance is formed in the surface portion of each pore of the carbonaceous electrode-element 2 by a treatment with concentrated sulphuric acid, which substance does not flow even at a high temperature above 100° C., but is highly resistant to the eroding action of nascent chlorine. This substance has such a degree of porosity that the chlorinated material, which has a relatively high viscosity even at a high temperature above 70° C., cannot flow out of the pores of the electrode, but electrolyte of relatively low viscosity can enter into the pores through the protective layer 1 at a very slow rate. The nascent chlorine liberated by electrolysis of the electrolyte which has entered into the pores, acts on the chlorinated material directly inside the protective layer and super-chlorinates the same at such a very low rate that the latter is further hardened while the electrode-element never collapses or crumbles. With this super-chlorination, HCl gas is of course produced, but the rate of production is so very low that it causes no collapsing or crumbling of the electrode. The protective layer 1 is, of course, gradually disintegrated in the course of its life, but before the layer has been completely disintegrated as shown in Fig. 2, the gradual super-chlorination of the filling material inside the layer 1 reaches to a substantial depth to form a substantial layer 3 of super-chlorinated material, and this super-chlorinated material is far harder than the ordinary chlorinated resins, oils, fats or fatty acids, and is never reacted even by nascent chlorine. By this way, the useful life of carbonaceous electrodes for the high temperature bath is prolonged to three to five times that of carbonaceous electrodes impregnated with ordinary chlorinated material for the low temperature bath. With about 1 mm. thickness of the protective layer 1, the above-mentioned super-chlorination requires some three months to reach a substantial depth.

In manufacturing the carbonaceous electrodes embodying this invention, any sorts of oil, fat or fatty acid may be utilized. When oil or fat is to be used, it is preferable to adopt those including glyceride of unsaturated fatty acid as much as possible, while when fatty acid is to be used, it is preferable to adopt an unsaturated one. Oil or fat may be any of the following, viz., fish oil, tung oil, linseed oil, cotton-seed oil, yegoma or perilla oil, etc.

Ordinary carbonaceous electrode-elements are, after being dried, placed within an impregnating apparatus of well-known construction, and after being hermetically closed the impregnating apparatus is pumped to be evacuated in order to remove air and other occluded gases from the electrode-elements therein.

On the other hand, chlorine gas is blown into oil, fat or fatty acid which is in liquid state, until it is chlorinated near zero iodine value, or chlorinated as far as possible. After the chlorination process, the liquid is heated to a temperature from 40 to 70 degrees centigrade in order to facilitate the impregnation. As an alternative for the heating or in addition to the heating, suitable solvent is added to the liquid. The liquid is then introduced into the impregnating apparatus in which the electrode-elements under treatment are placed as hereinbefore stated, and after being hermetically closed, the apparatus is pumped to increase the inner pressure to about 6 to 7 atmospheric pressures, and necessary impregnation is well effected. The electrode-elements are then withdrawn out of the apparatus, and are subjected to drying process when solvent was used as hereinbefore mentioned. This drying may be effected by heating the electrode-elements to relatively low temperature above the boiling point of the solvent used. The electrode-elements are then immersed into concentrated sulphuric acid of above 60 degrees of Baumé's hydrometer for example of about 66 degrees, and left for several days at low temperature or for several hours at elevated temperature.

By the above treatment, the surface portions of the chlorinated material filling pores of electrode-elements are converted into a substance having a proper porosity as hereinbefore specified to form the protective layer 1. The material forming this layer is mainly carbon, in other words, the chlorinated material, which existed in the corresponding space, has been charred by the concentrated sulphuric acid, and the porosity of this charred material is formed by the exclusion of the atoms other than carbon. Any material adhering over the surface of the electrode-elements after the impregnation process, which is electrically non-conductive, is also charred by the concentrated sulphuric acid, and this charred material cannot be held on the surface of the electrode-elements and drops therefrom during the sulphuric-acid treatment. Concentrated nitric acid may also be used in place of sulphuric acid.

According to the provisions of the patent statutes, I have explained the principle and mode of operation of this invention and have illustrated and described what I now consider to represent its best embodiment. However, I desire to have it understood that within the scope of the appended claims, the invention may be practiced otherwise than as specifically illustrated and described.

I claim as my invention:—

1. A carbonaceous electrode having its pores filled with chlorinated material belonging to the group consisting of oil, fat and fatty acid, comprising a protective layer of electrically conductive substance covering the body of said electrode and having such a degree of porosity that said chlorinated material cannot flow out of said pores of the electrode but electrolyte can enter into said pores through said protective layer at a very slow rate when used in electrolytic operation.

2. A carbonaceous electrode having its pores filled with chlorinated material belonging to the group consisting of oil, fat and fatty acid, comprising a protective layer of carbonaceous material covering the body of said electrode and having such a degree of porosity that said chlorinated material cannot flow out of said pores of the electrode but electrolyte can enter into said pores through said protective layer at a very slow rate when used in electrolytic operation.

3. A carbonaceous electrode having its pores filled with chlorinated material belonging to the group consisting of oil, fat and fatty acid, comprising a protective layer of charred material covering the body of said electrode and having such a degree of porosity that said chlorinated material cannot flow out of said pores of the electrode but electrolyte can enter into said pores through said protective layer at a very slow rate when used in electrolytic operation.

4. A carbonaceous electrode having its pores filled with chlorinated material belonging to the group consisting of oil, fat and fatty acid, comprising a protective layer of a substance formed by charring the surface portions only of said chlorinated material filling said pores by treatment with concentrated sulphuric acid.

5. A carbonaceous electrode having its pores filled with chlorinated material belonging to the group consisting of oil, fat and fatty acid, comprising a protective layer of a substance formed by charring the surface portions only of said chlorinated material filling said pores by treatment with concentrated nitric acid.

MASUTARO SUZUKI.